May 21, 1935.   A. S. BEVIN   2,002,255
HARROW
Filed Feb. 13, 1934

Inventor:
Alister Stewart Bevin
By
Attorney

Patented May 21, 1935

2,002,255

UNITED STATES PATENT OFFICE 2,002,255

HARROW

Alister Stewart Bevin, Whangarei, New Zealand

Application February 13, 1934, Serial No. 711,038
In New Zealand November 1, 1933

3 Claims. (Cl. 55—149)

This invention relates to that well known type of harrow used principally in respect of grass lands, in top dressing and cultivating operations, but useful also in other harrowing operations, in which the harrow is formed by the combination with a draught frame of a number of tines extending rearwardly in parallel lines from the frame, and which tines are individually hinged or pivoted on the draught frame to allow of their rear toothed ends independently rising and falling to permit of the harrow travelling freely over variations in the ground's surface, and to obtain flexibility in the harrow's movements.

The invention relates more particularly to a novel form of tine member for use in the formation of such a type of harrow and it has been designed with the object of providing a construction of tine that will, while being dragged from the frame, effect a forward push upon the tine point to cause it to cut into the ground surface to its fullest extent, and in which also a self clearing of the tine point from accumulations of growths collected thereby is effected, to thereby prevent the choking of the harrow. In addition, the form in which the tine is made will provide for the self regulation of its depth of cut.

The invention consists therefore in the manufacture of a harrow of the said type by the combination with a draught frame, embodying a main cross bar, of a number of tine members each constructed of a length of bar metal shaped with a swivel eye at its forward end to fit round such cross bar, and at its rear end doubled round and extended forwardly to form a tooth that inclines forwardly and downwardly from a level above the bar level to a point, extending to a distance below the bar level, such bar being also shaped to position the tine tooth in a direct line with the swivel end of the tine and with the line of travel of the harrow. The tine may vary in its details of formation in a number of ways without departing from the general features above referred to, which ensure of the tine tooth point being effectively directed into the ground surface as the tine is dragged by the draught frame, for the matter collected by the tooth being carried up by sliding over its inclined forward edge and then being thrown clear of the tooth to fall behind, and for the drag tension on the tine being directed to the tooth in the direct line of the implement's travel, thereby avoiding any tendency to wobble in the direction of its movement. Moreover, the main part of the tine, by its engagement on the ground's surface, will automatically regulate the depth of cut to a maximum represented by the amount the tine tooth extends below the level of such portion.

If desired, the tine tooth may be provided with a removable point fitting as a sleeve thereon. This may be made adjustable on the tooth to allow of its depth of cut being adjusted.

Also, if desired, the tine tooth may be given a curving set from front to rear to produce a plough mouldboard effect in its travel through the ground surface, such as to open up the cut to a slight extent.

The invention is illustrated in the accompanying drawing, in which:—

Figure 1:
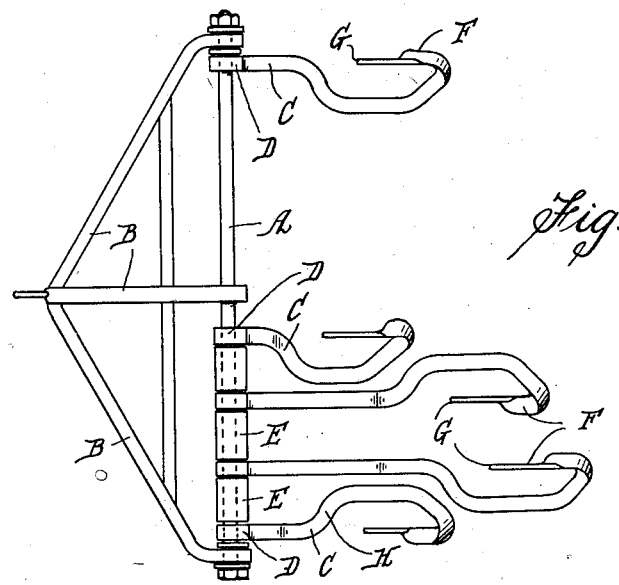
Figure 1 is a plan of the harrow showing only some of the tines.
Figure 2:
Figure 2 is an end elevation thereof.

Referring to Figures 1 and 2, A is the main cross bar of a suitable draught frame B capable of being dragged along the ground surface by attachment to any approved hauling means. This draught frame may be of any approved design such as commonly employed in these circumstances.

C are the tines of the harrow, these being arranged to extend rearwardly from the cross bar A and in parallel lines, and each being made at its forward end with a swivel eye D that fits loosely on to the said bar to provide for the tine hinging or pivoting in a vertical plane. The tines are spaced apart transversely by suitable distance collars E threaded on to the cross bar. In these respects the harrow shown follows well known forms of construction and operation.

In this invention, however, the tines are made of any of a number of forms possessing the characteristics of formation and operation hereinbefore described. For these purposes each tine is made of a single length of flat cross sectioned bar of a suitable metal, as steel, or in some cases wrought iron, having the eye D formed at its forward end. The rear end of the bar is doubled round so that its extremity extends forwardly to form the tine tooth F and the bar at a suitable point in its length is bent transversely so that the tooth F is positioned in the longitudinal line of the forward or swivel end. The tooth F is so shaped that it inclines forwardly and downwardly to a point G and this tooth portion also is so shaped that the forward inclined edge extends from a distance below the level of the bar length, and, preferably, to a distance above such level.

Several adaptations of these features of formation are shown in the drawing, the construction of tine shown in Figures 1 and 2 providing for the bar length being arranged with its broad face horizontal for the whole of its length and for its tooth F then being formed by curving the rear end of the bar up and out and then forwardly and by imparting a half twist in the bar to bring the broad face into a vertical plane and thus to present the narrow edge to the front. In this case also the bar has a downward and transverse bend H imparted to it while maintaining the broad face horizontal, to provide for the tooth being positioned in the longitudinal line of the swivel end and also for the rear portion of the bar only engaging the ground surface to form the support for the tine and to regulate the depth to which the tooth will penetrate. Also this portion will serve to act as a spreader for manure or fertilizer that may be spread over the surface being harrowed.

Figure 3:
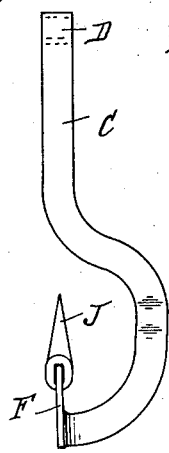
Figure 3 is an enlarged plan view of a modified form of tine, according to the present invention.
Figure 4:
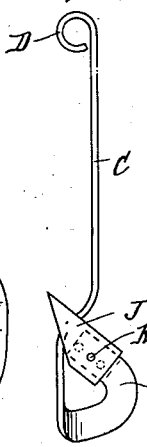
Figure 4 is a side elevation of the tine shown in Fig. 3.

The form shown in Figs. 3 and 4 is made similarly, but in this the tine tooth F is provided with a separately formed wearing point J formed to fit as a sleeve over the tooth bottom. This is then secured by a cross pin K passing through holes in the sides of the point and the tine tooth. By forming a number of holes one above the other in the tooth, or alternatively in the sides of the point, the distance the point extends below the tooth end may be varied and thus vary the depth of cut or penetration of the tine point.

Figure 5:
Figure 5 is an enlarged plan view of still another modified form of tine.
Figure 6:
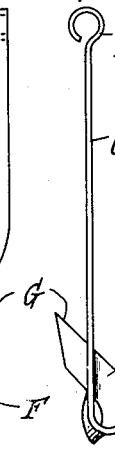
Figure 6 is a side elevation of the tine shown in Fig. 5.

In Figs. 5 and 6 the form shown provides for a flat bar extending horizontally in the same plane for the major portion of its length and then given the transverse bend at its rear and the upward and forward twist to form the tooth F. The tooth is given a concavo-convex transverse curving, or a sideways twist or set to impart a slight mouldboard effect in its operations.

Figures 7, 8:
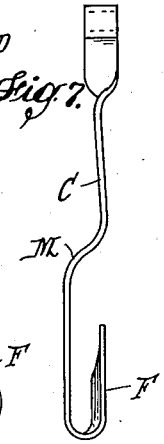
Figure 7 is an enlarged plan view of a still further modified form of tine.
Figure 8 is a side elevation of the tine shown in Fig. 7.

In the form shown in Figs. 1 and 8 the bar length is twisted on its axis close up to the swivel eye and carried rearwardly with its broad face in the vertical line, bent transversely, as at M, and its rear doubled round and shaped to form the tooth F, which in this case also may be given a mouldboard shaping.

The several detail features of formation employed in these different shapes of tines may be used in each one and various other forms possession similar characteristics may be devised and employed.

A harrow as thus made is capable of easy transport as by throwing the tines up and forwardly on their pivots they may be supported on the draught frame to permit of the harrow being dragged idly over the ground surface, or of being stowed into small compass for carriage in a truck or other transporting vehicle.

I claim:—

1. In a harrow having a draught frame embodying a main cross bar and a number of tines, said tines being formed of metallic bar lengths disposed to extend in parallel lines from the rear of the draught frame and each of which tines is independently pivoted at its forward end upon the cross bar and is shaped with its rear end doubled round and upwardly and then to extend forwardly in tooth form, the forward edge of which inclines downwardly and forwardly from a distance above to a point positioned a distance below, the level of the main portion of the tine forming bar.

2. A harrow tine constructed of a length of bar metal of flat cross-section, shaped at its forward end with a swivel eye extending across the board width of the bar, and at its rear end doubled round and extended forwardly for a distance in a manner to bring such end into longitudinal line with the swivel eye, and which end is made into tooth form with the broad face of the bar extending vertically and its forward edge inclining downwardly and forwardly from a distance above, to a point positioned a distance below, the level of the main portion of the tine forming bar.

3. A harrow tine constructed as described in claim 2, in which the tooth of the tine is provided with a removable point made as a sleeve to fit on to the tooth and secured thereto by means permitting of its adjustment up and down on the tooth.

ALISTER STEWART BEVIN.